R. A. FROMM.
OVERHEAD CONTACTOR FOR ELECTRIC RAILWAYS.
APPLICATION FILED JUNE 15, 1917.
1,287,950.
Patented Dec. 17, 1918.
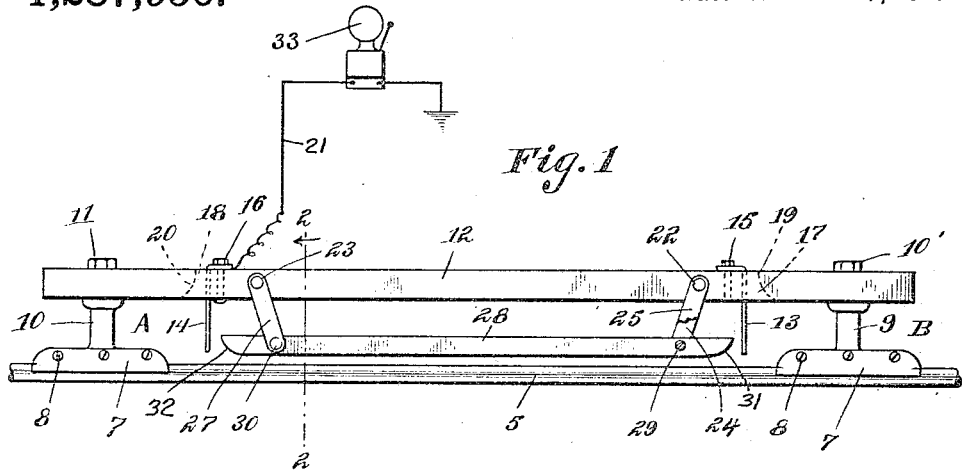
Fig. 1
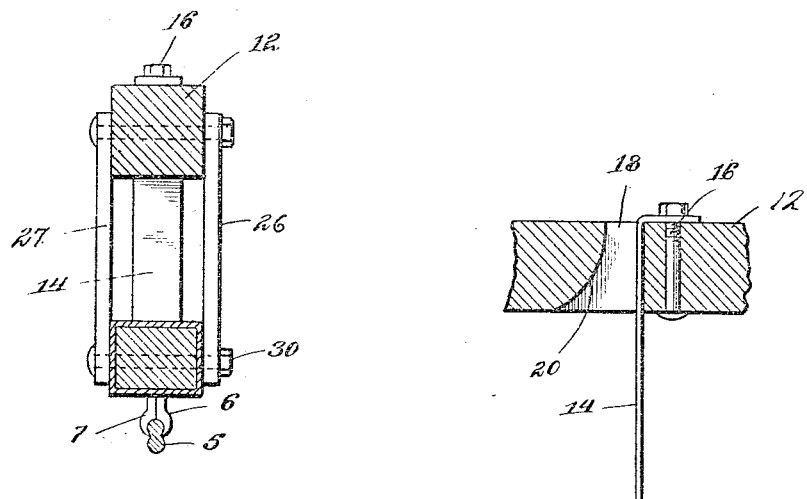
Fig. 2
Fig. 3
WITNESSES
C. F. Rudolph
H. G. Pierson
INVENTOR
Robert A. Fromm,
BY Victor J. Evans
ATTORNEY

UNITED STATES PATENT OFFICE.

ROBERT A. FROMM, OF SAN BERNARDINO, CALIFORNIA.

OVERHEAD CONTACTOR FOR ELECTRIC RAILWAYS.

1,287,950.  Specification of Letters Patent.  Patented Dec. 17, 1918.

Application filed June 15, 1917. Serial No. 175,021.

*To all whom it may concern:*

Be it known that I, ROBERT A. FROMM, a citizen of the United States, residing at San Bernardino, in the county of San Bernardino and State of California, have invented new and useful Improvements in Overhead Contactors for Electric Railways, of which the following is a specification.

This invention is an overhead contactor more particularly adapted for use in connection with electric railways employing a trolley wire wherein the contactor is operated by a trolley wheel or other current collecting device.

One object of the invention is to provide a contactor consisting of few parts, simple and strong in construction, not liable to derangement, and one that is effective to open and close the circuit.

Another object of the invention is to provide a contactor capable of opening and closing a signal circuit by the passage of a trolley wheel or other current collecting device bearing against the trolley wire.

A further object is to provide a contactor with a movable member suspended from a tie bar so that it will move in planes parallel to the bar and to form the ends of the member to engage with a spring element to close an electric signaling circuit.

The invention, broadly stated, comprises a tie bar, a plurality of ears or clips secured to the trolley wire, said tie bar being also secured to said clips and serving as a spacing member, a plurality of resilient members secured to the tie bar and extending downwardly, a movable member suspended from the tie bar and preferably between the resilient elements, which member has its ends so formed as to provide a sliding contact with the resilient elements, the suspension of the movable member being such as to permit the member to move in planes parallel to the tie bar, terminals for said resilient elements, and circuits including a signal connected to said terminals.

One practical form of construction will be described and illustrated in the accompanying drawings, in which:—

Figure 1 is a side elevation of the switch attached to a trolley wire;

Fig. 2 is a sectional view on the line 2—2 of Fig. 1, and

Fig. 3 is a detail view of one of the spring elements, a portion of the bar and clip or ear.

The trolley wire, indicated at 5, may be of the usual form and is preferably of the 8-shaped type. Connected to the trolley wire 5 are clips or ears, generally indicated at A and B. These clips comprise a body portion 6, to which may be secured a separable portion 7, which separable portion may be secured to the body portion by means of the screws 8. Projecting upwardly from the body portion are stems 9 and 10. The upper ends of each of these stems are provided with flat faces and centrally disposed in these flat faces are threaded holes.

To coöperate with the threaded holes are suitably threaded bolts 10 and 11. The tie bar 12 may be formed of any suitable material but it is preferred to have it of material that is an insulator for the electric current.

Adjacent the ends of the bar 12 are suitable holes, or passages therethrough, through which are adapted to pass the bolts 10 and 11. Thus the tie bar 12 may be secured to the clips or ears A and B and firmly held. The tie bar when so held will also act or serve as a spacing member for the clips or ears.

Disposed at convenient points upon the tie bar are resilient elements 13 and 14. As shown, these resilient elements are of the leaf type and are secured at one end upon the upper side of the tie bar 12 by means of the bolts and nuts 15 and 16. These bolts 15 and 16 are adapted to pass through the tie bars 12 so that the ends of the resilient elements 13 and 14 may be firmly secured.

As shown these resilient elements are provided with a right angled bend forming an L-shaped spring and the short end thereof is in contact with the upper face of the tie bar. The long end or vertical section of the spring is adapted to pass through a suitable slot. As there are two of these resilient elements, two slots 17 and 18 are provided. These slots are so shaped that when the spring is in its normal position the long portion extends downwardly and lies in contact with a flat surface. The other sides of the slots are formed with curves which are indicated at 19 and 20.

The bolts 15 and 16 may be also employed as terminals to which may be connected circuit wires, one of which is indicated at 21. Disposed between the bolts 15 and 16 are suitable holes, through which may pass bolts indicated at 22 and 23, which bolts serve as pivotal mountings for links indicated at 24, 25, 26 and 27. These links are preferably disposed upon each side of the tie bar 12, and at their lower ends they are connected to a movable member 28, by means of the bolts 29 and 30.

The bolts 22, 23, 29 and 30 may be replaced by any other or usual fastening means that will permit freedom of movement between the links, tie bar and the movable member 28. The movable member 28 may be formed in any convenient way, although as shown it is provided with the beveled ends indicated at 31 and 32 so that upon movement of the member 28 it may ride into contact and engage with the resilient elements with as little friction as possible, the links permitting the free suspension of the movable member 28 below the tie bar and adapting the member to move in either direction upon the movement of the current collecting device bearing against the trolley wire 5. If desired, the movable member 28 may be formed of wood and sheathed with a conducting material, which material may be nailed or screwed, or secured in any other suitable manner to the member. It may also be made as a solid conducting bar. The circuit wire indicated at 21 may lead to a suitable signal indicated at 33, which signal may be a bell or other indicating device.

As will be obvious, the trolley wheel is adapted to be brought into contact with the movable member 28. The wheel being forced into contact with the trolley wire 5 by means of the spring upon the trolley stem, the flanges of the trolley wheel force this movable member to swing so that one of its ends will be brought into contact with one of the resilient elements 13 or 14.

As shown, the signal wire 21 for the circuit may be secured to the resilient element 14. Thus it will be seen that the contacting is operable to close the signal circuit upon movement of the car and its trolley wheel in one direction.

As shown, the movable member 28 does not engage with the resilient element 13 and 14 but swings freely therebetween. The movable member 28 is positioned just above the trolley wire 5 as shown more particularly in Fig. 1.

Minor changes in the form, proportions, and details of construction may be resorted to without departing from the spirit of the invention or the scope of the appended claim.

What is claimed is:—

An overhead contactor comprising a tie bar supported above a trolley wire, a shoe supported from the tie bar to swing in either direction through contact with the wire engaging element, a resilient element arranged immediately beyond each end of the shoe to be engaged by the shoe in its movement, each element being supported in the tie bar and in openings therein having a wall next to the shoe at right angles to the bar and the opposing wall downwardly and outwardly divergent relative to the shoe.

In testimony whereof I affix my signature.

ROBERT A. FROMM.

Copies of this patent may be obtained for five cents each, by addressing the "Commissioner of Patents, Washington, D. C."